April 2, 1929.
J. MASSOLLE
ELECTROSTATIC TELEPHONE
Original Filed Aug. 3, 1925
Re. 17,257
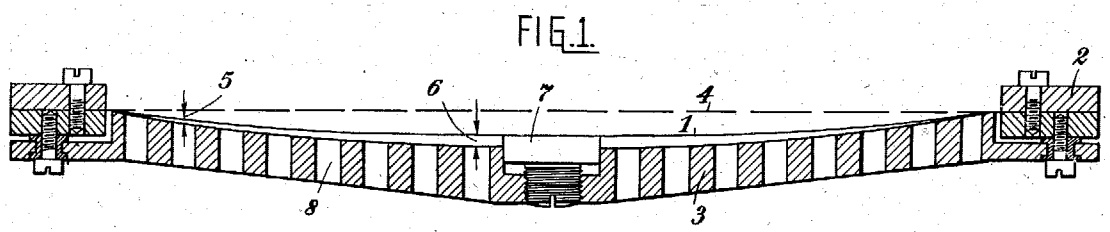
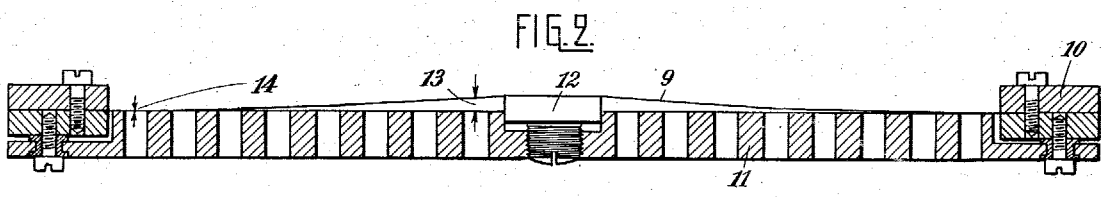
Inventor
Joseph Massolle,
by
Ward Crosby and Smith
His attorneys.

Reissued Apr. 2, 1929. Re. 17,257

UNITED STATES PATENT OFFICE.

JOSEPH MASSOLLE, OF BERLIN-WILMERSDORF, GERMANY, ASSIGNOR TO TRI-ERGON A. G., OF ZURICH, SWITZERLAND, A CORPORATION OF SWITZERLAND.

ELECTROSTATIC TELEPHONE.

Original No. 1,582,848, dated April 27, 1926, Serial No. 47,661, filed August 3, 1925. Application for reissue filed February 20, 1929. Serial No. 341,548.

The electrostatic telephones for transforming alternating electric currents with sound characteristics into sound waves, as hitherto used, comprise a rigid capacity body and an elastic or resilient diaphragm located in close proximity to the former and consisting of a mica film or the like with a metallic coating thereon. If electric potentials are applied intermediate between the rigid capacity body and the metallic coating, the distance between the diaphragm and the capacity surface of the rigid body will vary according to the degree of applied potential, due to electrostatic attraction and the movements of the diaphragm will produce sound or acoustic vibrations in the surrounding air coupled therewith.

The sound waves should correspond, as regards their curve shape, as nearly as possible to the fluctuations of the potential. Obviously any vibrating diaphragm has a series of pronounced resonance notes or tonality and the frequencies corresponding to such resonance notes involve or produce disproportionately wide amplitudes of the diaphragm and overrun considerably all of the other frequencies.

The object of this invention is to have the form of the curve correspond perfectly to the variations of the fluctuations of applied potential and with this object in view the distance between the capacity surface and the diaphragm is made essentially less near the periphery than at the centre so that the diaphragm will be influenced by the electrostatic forces with a power gradually increasing in the direction from the centre towards the periphery. In this way the diaphragm will be efficiently prevented from swinging in pronounced resonance notes.

With the above recited and other objects in view, reference is had to the following specification and to the drawings in which there are exhibited two examples or embodiments of the invention which are in no way intended as a limitation upon the scope of the appended claims as it is to be clearly understood that variations and modifications which properly fall within the scope of said claims may be resorted to when found expedient.

In the accompanying drawings forming a part of this specification Figure 1 is a sectional view of one embodiment of the improved electrostatic telephone, and Figure 2 is a similar view showing a second embodiment thereof.

Referring to Figure 1 the diaphragm 1, is peripherally attached to and enclosed in a frame 2. In close proximity to the diaphragm but a small distance apart therefrom, a rigid capacity body 3 of slightly concave, preferably conical, shape is provided and firmly connected with the frame 2 by means of screws or the like, as clearly shown. The diaphragm may consist of a thin sheet of insulating material, such as mica, having a conducting metallic coating thereon.

If a constant electrical potential difference is provided intermediate between the capacity surface of the body 3 and the metallic coating of the diaphragm, the latter will be bent inwards, upon talking, from the position of rest, shown in dotted lines at 4, into the position 1 shown in full line. The shape of the capacity body or of the active surface thereof involves that the distance between the capacity surface and the diaphragm is substantially less near the periphery as at 5, than at a central point thereof, as at 6. Consequently the electrostatic forces are substantially more powerful near the periphery than near the centre of the diaphragm and the capacity surface, so that the diaphragm will be controlled or influenced with increasing intensity from the centre towards the periphery thereof.

The seat formed by the head 7 of a screw provided at the centre of the body 3, serves the purpose of supporting the diaphragm centrally, in order to produce smaller distances between the diaphragm and the body 3 which are equivalent to or bring about an intensification of sound.

The capacity body 3 is provided with perforations 8 for the purpose of reducing the damping in the narrow space between the diaphragm and the body 3. The damping is chiefly produced by or dependent upon the friction of the air fluctuating on and between the diaphragm 1 and the capacity surface, so that it will be possible to control the aerial friction and reduce the same to any desired degree by adequately dimensioning the perforations 8 or selecting the number and position thereof.

Referring to Figure 2 showing a modification of the embodiment described with reference to Figure 1, 9 designates the diaphragm having a metallic coating, 10 is the frame in which the diaphragm is peripherally enclosed and 11 is the capacity body. As will be seen in Figure 2 the latter is a flat or plane body and not of conical shape as in Figure 1. In this modification the diaphragm 9 is kept at the desired distance away from the body 11 by means of the head 12 of the adjustable central screw, and it is apparent that the said distance can be regulated, as required or desired by means of the screw, it being evident that at any such regulation the distance between the diaphragm 9 and the capacity body 11 will invariably be greater at the centre as at 13, than at the periphery of the parts, as at 14.

It goes without saying, that the diaphragm may be divided into a plurality of portions or sections or may be composed of several sections adapted to be influenced in the manner hereinbefore explained and specifically described with reference to Figures 1 and 2. In case of a diaphragm divided into or composed of several sections each point or place where the same are clamped in or otherwise attached to a frame or the like, will be endowed with the described properties peculiar to the peripheral portion of the diaphragm.

What I claim is:

1. An electrostatic telephone comprising a rigid capacity body and a diaphragm connected therewith constituting a movable condenser plate, the construction and arrangement of the parts being such that the distance between the said body and the said diaphragm is less at the periphery than at the centre thereof.

2. An electrostatic telephone comprising a rigid capacity body, a resilient diaphragm constituting a movable condenser plate, and means for securing said diaphragm in spaced relation to said body, said parts being so constructed and arranged as to provide an air gap between said body and diaphragm of a width decreasing progressively from the center of the diaphragm and body towards the periphery thereof.

3. An electrostatic telephone comprising a rigid plate constituting a capacity body, a resilient diaphragm constituting a movable condenser plate extending over said plate, the surface of said plate adjacent to said diaphragm being plane, means for holding the central portion of said diaphragm at a definite distance from said plate, and means for holding the edge of said diaphragm at a less distance from said plate.

4. An electrostatic telephone comprising a rigid plate, constituting a capacity body, a resilient diaphragm extending over said plate, said plate having a central abutment extending upwardly beyond the adjacent surface thereof, and means for securing said diaphragm with its central portion extending over and contacting said abutment and its edges secured at a less distance from said plate than the distance between the portions of said diaphragm adjacent to said abutment, and said plate.

5. An electrostatic telephone comprising a rigid plate constituting a capacity body and a resilient diaphragm constituting a movable condenser plate held in face to face relation with said rigid plate at distances between the same which vary, the variation in said distances being adapted to overcome pronounced resonance of said diaphragm when acoustically modulated electrical potentials are applied between said rigid and movable plates.

6. An electrostatic telephone comprising a rigid flat capacity body, a diaphragm connected therewith constituting a movable condenser plate, and a means for adjustably holding the diaphragm a certain distance apart from the said body, the said distance gradually increasing from the periphery towards the centre of the two parts.

7. An electrostatic telephone, comprising a rigid, plane capacity body, a diaphragm connected therewith, and a screw in the centre of the said body for adjustably holding the diaphragm a certain distance apart from the said body, the said distance gradually increasing from the periphery of the said diaphragm towards the said screw, substantially as and for the purpose set forth.

8. An electrostatic telephone, comprising a rigid capacity body, a diaphragm connected therewith, constituting a movable condenser plate, and means for holding the latter firmly connected with the said body at a varying distance apart from the same, said rigid body having perforations therethrough.

9. An electrostatic telephone according to claim 8 and having portions of the diaphragm contacting with opposed portions of the rigid perforated body.

10. An electrostatic telephone according to claim 5 and in which the diaphragm comprises a thin sheet of highly flexible material carrying conductive means and maintained in stretched condition.

11. An electrostatic telephone according to claim 8 and in which the diaphragm is divided into a plurality of vibratory sections.

12. An electrostatic telephone according to claim 5 and in which the diaphragm comprises a thin sheet of highly flexible insulating material carrying a conductive coating and is maintained in stretched condition with a curvature extending over a substantial area thereof.

13. An electrostatic telephone according to claim 8 and in which the diaphragm is divided into a plurality of vibratory sections, the edges of each of said sections being maintained in closer relationship to said capacity body than other portions.

14. An electrostatic telephone according to claim 5 in which the rigid plate is provided with numerous perforations distributed over its area.

15. An electrostatic telephone according to claim 5 and in which the surface of the diaphragm facing the capacity body is maintained stretched in a generally concaved shape.

16. An electrostatic telephone according to claim 8 in which peripheral clamping means for the diaphragm is provided at the periphery of the rigid capacity body.

17. An electrostatic telephone according to claim 5 and in which the surface of the diaphragm facing the capacity body is maintained stretched in a generally concaved shape, portions of the diaphragm however being curved toward the rigid capacity body during operation of the device.

18. An electrostatic telephone according to claim 5 and in which the surface of the diaphragm facing the capacity body is maintained stretched in a generally concaved shape, the central portion of the capacity body engaging the diaphragm and displacing the same to form the concaved shape.

In testimony whereof, I have signed my name to this petition.

JOSEPH MASSOLLE.